United States Patent [19]

Rahuel et al.

[11] Patent Number: 5,452,288

[45] Date of Patent: Sep. 19, 1995

[54] METHOD FOR THE TRANSMISSION OF DIGITAL DATA IN RADIO PAGING SYSTEMS AND CORRESPONDING RADIO PAGING RECEIVER

[75] Inventors: Jean-Claude Rahuel; Daniel Pommier, both of Rennes, France

[73] Assignees: France Telecom; Telediffusion de France, both of Paris, France

[21] Appl. No.: 43,255

[22] Filed: Apr. 6, 1993

[30] Foreign Application Priority Data

Apr. 8, 1992 [FR] France ................... 92 04479

[51] Int. Cl.⁶ .................... H04J 1/14; H04J 11/00
[52] U.S. Cl. ........................ 370/19; 370/76; 370/95.1; 370/100.1; 375/260; 455/38.2
[58] Field of Search ................ 370/18-21, 370/95.1, 3, 69.1, 76, 112, 110.1, 100.1; 375/38, 39; 455/60, 38.1, 38.2, 59; 340/825.44, 825.47; 371/43, 45; 370/69.1, 76, 112, 110.1, 100.1

[56] References Cited

U.S. PATENT DOCUMENTS

| | | | |
|---|---|---|---|
| 4,881,241 | 11/1989 | Pommier et al. | 375/38 |
| 5,168,271 | 12/1992 | Hoff | 370/95.1 |
| 5,191,576 | 2/1993 | Pommier et al. | 370/18 |
| 5,197,061 | 3/1993 | Halbert-Lassalle | 370/11 |
| 5,228,025 | 7/1993 | Le Floch et al. | 370/20 |
| 5,241,305 | 8/1993 | Fascenda et al. | 340/825.44 |

FOREIGN PATENT DOCUMENTS

| | | |
|---|---|---|
| 0369917 | 11/1989 | European Pat. Off. . |
| 2114343 | 8/1983 | United Kingdom . |
| 8603645 | 6/1986 | WIPO . |

*Primary Examiner*—Douglas W. Olms
*Assistant Examiner*—Chau T. Nguyen
*Attorney, Agent, or Firm*—Merchant & Gould Smith, Edell, Welter & Schmidt

[57] ABSTRACT

A method for the transmission of digital data elements including radio paging information elements, wherein the data elements are transmitted according to a technique of transmission implementing a plurality of orthogonal carrier frequencies (the COFDM technique), the signal being organized in frames comprising, firstly, at least one first channel called a fast information channel, comprising at least one symbol of data elements, the carrier frequencies of the symbols being modulated by data elements that are not temporally interleaved, and at least one second channel, called a main channel, comprising at least one symbol of data elements, the carrier frequencies of the symbols being modulated by data elements that are temporally interleaved beforehand, a frame number belonging to a set of predefined frame numbers being regularly inserted into the fast information channel, each of the radio paging receivers being assigned at least one of the frame numbers.

10 Claims, 6 Drawing Sheets

METHOD FOR THE TRANSMISSION OF DIGITAL DATA IN RADIO PAGING SYSTEMS AND CORRESPONDING RADIO PAGING RECEIVER

BACKGROUND OF THE INVENTION

1. Field of the Invention

The field of the invention is that of digital data transmission systems.

More specifically, the invention relates to transmission systems that enable the conveying of a specific message by RF links to a given receiver or solely to this receiver.

It can be applied notably to systems in which at least certain receivers work intermittently (i.e. go into operation periodically, at predetermined instants).

A favored field of application of the invention is that of unilateral paging. The term paging refers to any system that enables the transmission of a message to a portable pager or receiver that can advantageously be contained in the user's pocket. These systems can notably be used to transmit a message to a person who is away from his office when the sender of the message is unaware of his whereabouts.

2. Description of the Prior Art

In a standard way, and in the most simple case, such systems provide for the emission of a sound and/or visual signal by the pocket receiver when a message is received. These systems are generally known as simple person call systems. When the subscriber who has the receiver receives a message, he makes a phone call to a pre-determined number, for example that of his secretary's office, or interrogates a voice message system (by telephone) or computer message system, by means of a teletext terminal such as a Minitel (registered mark) unit.

Other improved receivers enable the reception and display of a short digital message, for example a telephone number to be called or a coded information element.

Receivers such as these are notably used in radio paging systems known by the names "Operator" (registered mark) and "Alphapage" (registered mark) available in France.

These radio paging systems, just like all the other presently known radio paging systems, have many drawbacks.

Firstly of all, they enable the transmission, at best, of only a short message. This means that in practice, the subscriber receiving a message must routinely look for a telephone to find out the contents of the information intended for him. This is a cumbersome procedure that is sometimes difficult to put into practice.

It may be imagined, for example, that it is difficult to find a telephone and even more difficult to find a Minitel (registered mark) on a motorway. In this case, the time at which the user gets to know the information will be greatly delayed, and this may sometimes have detrimental effects.

Furthermore, since portable receivers can be powered only by cells or batteries, these receivers must work intermittently for obvious reasons of operating autonomy. More specifically, a radio paging receiver is most usually in a stand-by watch state (only a clock is powered) and goes into cyclical operation to detect a message, if any, that is intended for it.

This implies a particular system of management of the instants of transmission, so that each message is sent only when the intended receiver has left the stand-by watch state to go into operation.

On the other hand, the receivers must have specific synchronization systems so as to control the instants at which they go into operation. To achieve this, in the known systems, temporal synchronization data elements are inserted among the radio paging messages. For example, in the case of the Operator (registered mark) system, codes representing minutes and tenths of minutes are sent. A major drawback of this technique is that it is necessary to decode all the information elements transmitted up to the detection of a synchronization code, which keeps the receiver in operation for a certain period of time, which means that electrical power is consumed.

The patent application No. WO-8 603 645 also presents a technique for the synchronization of a radio paging system based on a division of time. More specifically, this document proposes the division of time into intervals (known as frames, sub-frames and time slots), the numbering of these slots and the assigning of the numbers to the receivers.

Again, the receivers are required to have precise knowledge of the time in order to get activated at the right instants. To do this, the system carries out the transmission, in each sub-frame, of an information element bearing the date and time. At each activation, the receiver must therefore read this information element and reset its clock accordingly, if necessary. These operations also keep the receiver in operation for a certain period of time, leading to high power consumption.

Furthermore, this radio paging system, as well as many present systems of radio paging, require a complete specific structure and notably particular transmitters. This is also the case with the Alphapage (registered mark) system.

In this case, the costs of installing a radio paging system of this type are high and are reflected, firstly, in the cost of the receivers and, secondly, in the cost of the communications.

Furthermore, the need for these specific installations greatly restricts the geographical coverage of these radio paging systems, only bigger zones (bigger in terms of traffic) being covered in general.

In other cases, the radio paging systems rely on an already existing frequency modulation broadcasting network. The infrastructural costs are then lower, but this is achieved at the cost of greater complexity of the receivers. In particular, since the geographical coverage of a transmitter working by frequency modulation is limited, it is necessary, if the radio paging service is to cover a huge territory, for the each receiver to include demodulation frequency changing means and means for the selection of the best demodulation frequency at each instant (RDS or Radio Data System).

Furthermore, known broadcasting systems meet with difficulties of FM signal reception in many situations, especially when they are mobile and/or are used in urban environments (due to the Doppler effect, fading, echos, multiple paths, jamming etc.). They therefore do not offer sufficient guarantees of reception.

It is notably an object of the invention to overcome these different drawbacks of the prior art.

SUMMARY OF THE INVENTION

More specifically, a first aim of the invention is to provide a method of digital data transmission that can be used to set up a unilateral radio paging service offering a high bit rate and, notably, a bit rate that is far higher than the bit rate offered by known radio paging methods.

Consequently, an aim of the invention is to provide a method such as this that can be used to provide for precise synchronization of intermittently operating receivers, as well as easy and swift resynchronization in the event of a loss of synchronization.

Another aim of the invention is to provide a method such as this enabling the precise synchronization of intermittently operating receivers, as well as easy and swift resynchronization in the event of loss of synchronization.

Another aim of the invention is to provide a method such as this in which the synchronization is done in a simple way, notably for reasons related to the cost price of the receivers, and their weight and overall dimensions (the receivers have be pocket-sized) and, above all, the processing time.

Indeed, a major aim of the invention is to limit the processing operations that are necessarily carried out by the intermittently operating receivers. More specifically, an essential aim of the invention is to provide a method such as this enabling the maximum reduction of the electrical power consumption of the receivers so as to ensure, of course, the greatest possible autonomy for these receivers.

This aim implies, notably, the following two subgoals:
  reducing the operating time of each receiver, or more specifically increasing the ratio between the standby watch time, when the consumption of electricity is very limited, and the operating time;
  limiting the processing operations (analog and digital processing) performed during this operating time.

It is also an aim of the invention to provide a method such as this that can be used to broadcast radio paging messages over a vast geographical territory (for example throughout the French territory or throughout Europe) without requiring any changing of frequency demodulation or, consequently, any searches for the best demodulation frequency.

A particular aim of the invention is to provide a digital transmission method that implements the method known as the COFDM (Coding Orthogonal Frequency Division Modulation), the basic principles of which are notably described in the French patents Nos. FR 86 09622 dated 2nd July 1986 and FR 86 13271 dated 23rd September 1986, filed on behalf of the same Applicants.

This COFDM technique has notably been chosen for the European DAB (Digital Audio Broadcasting) system. An aim of the invention, therefore, is to provide a radio paging method that is compatible with the standards (under preparation) that define the DAB and enable a radio paging service to be provided.

More generally, an aim of the invention is a method that can be used for the simultaneous broadcasting of radio paging messages and other types of data elements, corresponding for example to digital audio signals, digital television signals, teletext signals etc.

Yet another aim of the invention is to provide a method of digital transmission such as this that can be used extend radio paging services by permitting, for example, the transmission of complete documents, images etc. In other words, one of the aims of the invention is to provide a method that can be used to define pagers or radio paging receivers that can receive information which is complete enough not to require the additional use of a telephone or a teletext terminal after the reception of a message.

It is also an aim of the invention to provide a method such as this, enabling the techniques of radio paging to be extended to many other applications such as, for example, the remote loading of data into portable microcomputers or the dispatching of information elements to mobile receivers (for example in the case of receivers on board automobiles, where it is desirable for the consumption of electricity to be limited, at least when the autombile is at a standstill) and more generally to all applications in which data elements have to be transmitted to devices that are autonomous as regards their electrical power supply and must therefore preferably use the intermittent mode of operation.

A complementary aim of the invention, naturally, is to provide low-cost, compact and light radio paging receivers that are compatible with a method such as this.

It is also an aim of the invention to provide a diversified range of radio paging receivers such as these, corresponding to different applications or to different levels of service.

These aims, as well as others that shall appear here below, are achieved according to the invention by means of a method for the transmission of digital data including radio paging information elements, designed notably for the transmission of radio paging messages towards at least one radio paging receiver having its own identifier, a method according to which said data elements are transmitted according to a sending technique implementing a plurality of orthogonal carrier frequencies and comprising the steps of:
  the generation of a series of source data elements representing a signal to be transmitted;
  the simultaneous modulation of each of said orthogonal carrier frequencies by one of said source data elements respectively, so as to form symbols of data elements constituted by said plurality of modulated carrier frequencies;
  the transmission of said symbols of data elements to at least one of said receivers;
said method comprising the steps of:
  the grouping of said symbols of data elements into frames of symbols, said frames comprising a predetermined number of symbols;
  the division of at least certain of said frames into at least two channels:
    * at least one first channel, called a fast information channel, comprising at least one symbol of data elements, the carrier frequencies of said symbols being modulated by data elements that are not temporally interleaved;
    * at least one second channel, called a main channel, comprising at least one symbol of data elements, the carrier frequencies of said symbols being modulated by data elements which, beforehand, are temporally interleaved;
  the insertion, in said fast information channel, of at least certain of said frames, known as numbered frames, of a frame number belonging to a set of predefined frame numbers, in such a way that each of said frame numbers is inserted into a frame at predetermined fixed time intervals;
  the assigning, to each of said radio paging receivers, of at least one of said frame numbers;
  the transmission of a radio paging message to one of said radio paging receivers, said message comprising firstly the identifier of said receiver and, secondly, useful information elements, at least said identifier being transmitted in said fast information channel of a frame bearing a number assigned to said receiver.

Thus, according to the invention, the data elements transmitted are organized in frames, at least certain of which are numbered. These numbers are used to facilitate the synchronization of the radio paging receivers. Indeed each receiver knows one or more frame numbers which correspond to frames capable of conveying a message intended for this receiver.

It must be noted that, unlike in the known techniques, this is not a case of direct time division but a numbering of the physical frames (a frame being a set of symbols and not a duration). The receiver is not synchronized with the real time but with the frames.

These frame numbers therefore enable a receiver to ascertain that it has gone from a standby watch state to the active state at the right times (i.e. when a frame bearing a number assigned to it is transmitted) and, if this is not the case, to determine, by a comparison of frame numbers, the instants at which it must go to the active state.

The invention enables very great flexibility in the way in which the frames are built and in the way in which the data elements are distributed in these frames. Thus, in particular:
  it is not always necessary for all the frames to be numbered. In an optimized system, it suffices that only the frames having a start of a message should be numbered. However, it is also possible to provide for the routine insertion of a frame number in all the frames, notably to overcome problems of synchronization, or again to make the number of the current frame immediately readable by a receiver that has just been activated;
  the time interval between two frames bearing the same number must imperatively be constant. By contrast, the time intervals, or cycle times, associated with these two distinct numbers may be different. This notably makes it possible to provide for several service levels in terms of speed of access to a receiver. In the case of a standard radio paging service, this predetermined fixed time interval between two frames bearing the same frame number may range, for example, from 30 seconds to 5 minutes. More generally, it will be chosen so as to be compatible with the corresponding service;
  with the same goal of providing service with several levels of quality, it is also quite possible to contemplate a case where several different frame numbers are assigned to one and the same receiver;
  it is not necessary for an entire message intended for a receiver to be sent in a frame bearing a frame number assigned to this receiver. It is enough that the start of this message should be sent in this frame. The rest of the message may be, for example, in the next frame, or at any other location stipulated by convention and/or designated in the starting part of the message;
  at least certain flames may convey data elements other than radio paging data elements.

Besides, it must be noted that the term "radio paging" is used here to mean not only the standard services used to transmit a message to a person who is away from his office (services sometimes called "person calls"), but also all the services that may require the broadcasting, by RF links, of messages intended for particular intermittently operating receivers (identified by a number or identifier that is unique to each receiver) for reasons of electrical power consumption.

These services may include, for example, the remote loading of a microcomputer, the paging of other mobile receivers etc.

Furthermore, the invention is also based on the implementation of a COFDM type orthogonal carrier frequency modulation technique. In this case, the radio paging service may be integrated into a broadcasting method, such as the one being standardized at the European level (this is the EUREKA "DAB" project). According to the invention, therefore, a frame comprises at least two channels:
  the fast information channel, containing a set of general information elements and notably the frame number. It may also include, notably when the radio paging data elements are not all in the fast information channel, an indicator of the presence of radio paging information in said frame (preferably placed in the first symbol of the channel).

In the fast information channel, the data elements are not temporally interleaved. Thus, the decoding is simplified (to the detriment of a slight loss with respect to protection against errors): it is not necessary to memorize a set of symbols (and hence to remain in a standby watch state during this time) to carry out the decoding. The processing operations and the time are limited, which is essential for autonomous receivers.

In particular, even when it is not possible for any reason (such as constraints of standardization) to place radio paging data elements at the start of a frame, it is not necessary to decode any useful data elements other than the information presence indicator when no radio paging information is present.

Preferably, this channel may furthermore (for example in the case of the DAB system) convey data elements that describe the structuring into channels of the current frame and/or the following frames;
  the main channel or channels which, for their part, are temporally interleaved so as to derive the full benefit of the advantages of the COFDM system. These channels may include complementary radio paging data elements (addressed by a system of pointers or designators contained in the fast information channel) but also many other types of data elements, and for example radio broadcasting signals, television signals etc.

A frame is constituted by successive symbols. A channel is constituted, for example, by at least one symbol of data elements.

When the fast information channel carries an indicator of the presence of radio paging information elements in said data field, and if this indicator states that no radio paging information is present in the frame, then the receiver may directly interrupt its activity without reading the data field. This results in a gain in electrical power.

Should a frame of data elements comprise at least two independent data conveying channels, it is advantageous for said fast information channel to be the first information channel of said frame.

Again, this enables the greatest possible reduction in the operating time of the radio paging receivers or pagers.

Advantageously, each of said frames starts with a series of at least one temporal and/or frequency synchronization symbol. It may notably include a wobbulation symbol, giving a phase reference for the demodulation of each carrier frequency of the following symbols of said frame.

In this case, preferably, the symbol bearing said frame number is advantageously placed immediately after the wobbulation symbol and is modulated differently with respect to said phase references given by said wobbulation symbol.

Advantageously, said radio paging information elements are encoded by means of a systematic convolutional code.

Thus, the radio paging information appears in plain form, associated with error correction data elements. It is then possible to envisage an adaptive operation of the receivers, as a function of the quality of the transmission channel. Indeed, there are few disturbances. It is not necessary to carry out the decoding, which means energy savings.

In one advantageous embodiment of the invention, said radio paging information elements comprise designators designating complementary data elements contained in at least one second data-conveying channel of the current frame and/or in at least one data conveying channel of at least one frame to come.

This new technique makes it possible notably to extend the fields of application of the radio paging receivers. Indeed, up till now, it has been possible to send only very short messages. This is also the case in the radio paging channel of the invention. By contrast, one or more complementary channels, capable for example of carrying an image, document or other type of data elements, may be added to this channel. Furthermore, these data elements may be distributed over several channels and/or over several frames.

Thus it is possible to define top-of-the-range radio paging receivers enabling the reception and display of images or documents. These receivers thus become quite autonomous. It is no longer necessary to call a telephone number when a message is received.

Furthermore, this enables providing for other applications of the method of the invention, such as the remote-loading of portable microcomputers.

Said complementary data elements contained in a second data conveying channel are temporally and/or frequency interleaved.

Thus, in the case of a DAB frame, this second channel benefits from the advantages of the COFDM technique (efficiency of the transmission even in the presence of strong disturbances). On the contrary, the fast information channel undergoes no temporal interleaving, so as to simplify the decoding and hence the electrical power consumption.

As already mentioned here above, each receiver has its own identifier.

Advantageously, a part of the identifier which is associated with the paging receiver corresponds to a frame number associated with said receiver, and the complementary part of said identifier designates solely said receiver.

The identifier may also be constituted, in part, by several frame numbers, for example when it is intended that the receiver will receive at least all the frames corresponding to these numbers.

Should the method of the invention be applied to a cellular broadcasting network, comprising at least two cells with distinct broadcasting zones, then it is advantageous for each of said radio paging receivers to be associated selectively with at least one of said cells, and for a radio paging message, intended for a given radio paging receiver, to be transmitted only to the cell or cells associated with said paging receiver.

The invention also pertains to paging receivers used to receive radio paging messages transmitted according to the above-described message.

A paging receiver such as this preferably comprises means for the periodic activation of said receiver acting in such a way that said receiver is in activity at each instant corresponding to the transmission of a numbered frame, the frame number of which is assigned to said receiver, means for the extraction of the frame number of each frame received by said paging receiver and means to control said periodic activation means as a function of said extracted frame number.

Advantageously, this paging receiver also comprises means to memorize at least one symbol containing radio paging information elements so that the demodulation and/or processing of said radio paging information elements are done in deferred time by the reading of the memorized symbols.

Since radio paging receivers work only intermittently, it is possible to carry out all or a part of the decoding on a deferred-time basis. This is a novel and particularly advantageous characteristic of the invention. For, it enables the use of processing means that cost less than those needed for real-time processing.

Should the data elements be transmitted in the form of differentially modulated symbols, it is advantageous for the symbol preceding the first symbol containing the radio paging information elements to be also stored in said memorizing means.

This previous symbol may, for example, be the wobbulation symbol.

Preferably, said radio paging information elements being encoded by means of a systematic convolutional code, the paging receiver comprises means for the selective activation of means for the decoding of data elements encoded by means of said convolutional code, as a function of an information element representing disturbances introduced by the transmission channel.

Finally, the transmission method of the invention makes it possible to provide for a method for the synchronization of receivers that is particularly efficient and uses up little processing time, said method comprising an initialization phase comprising the steps of:
the activation, at any instant, of said receiver;
the reading of the frame number of at least one frame at said any instant;
the computation of a time difference between a frame bearing the frame number read and a frame bearing the frame number assigned to said receiver;
and a phase for the periodic activation of said receiver at the instants corresponding to the transmission of a frame bearing a frame number assigned to said paging receiver.

BRIEF DESCRIPTION OF THE DRAWINGS

Other features and advantages of the invention shall appear from the following description of a preferred embodiment of the invention, given by way of a non-restrictive illustration, and from the appended drawings, of which.

MORE DETAILED DESCRIPTION

The preferred embodiment of the invention described here below can be integrated into a digital radio broadcasting system such as, for example, the DAB radio broadcasting system which is currently being standardized at the European level.

It is clear, however, that the invention is not restricted to this application and that, on the contrary, it can be implemented according to a great many other methods. In particular, it is in no way obligatory for the invention to share resources with other data elements (such as those pertaining to radio, TV etc.). For, it can be applied to a dedicated radio paging system such as the currently known systems.

Figure 1:
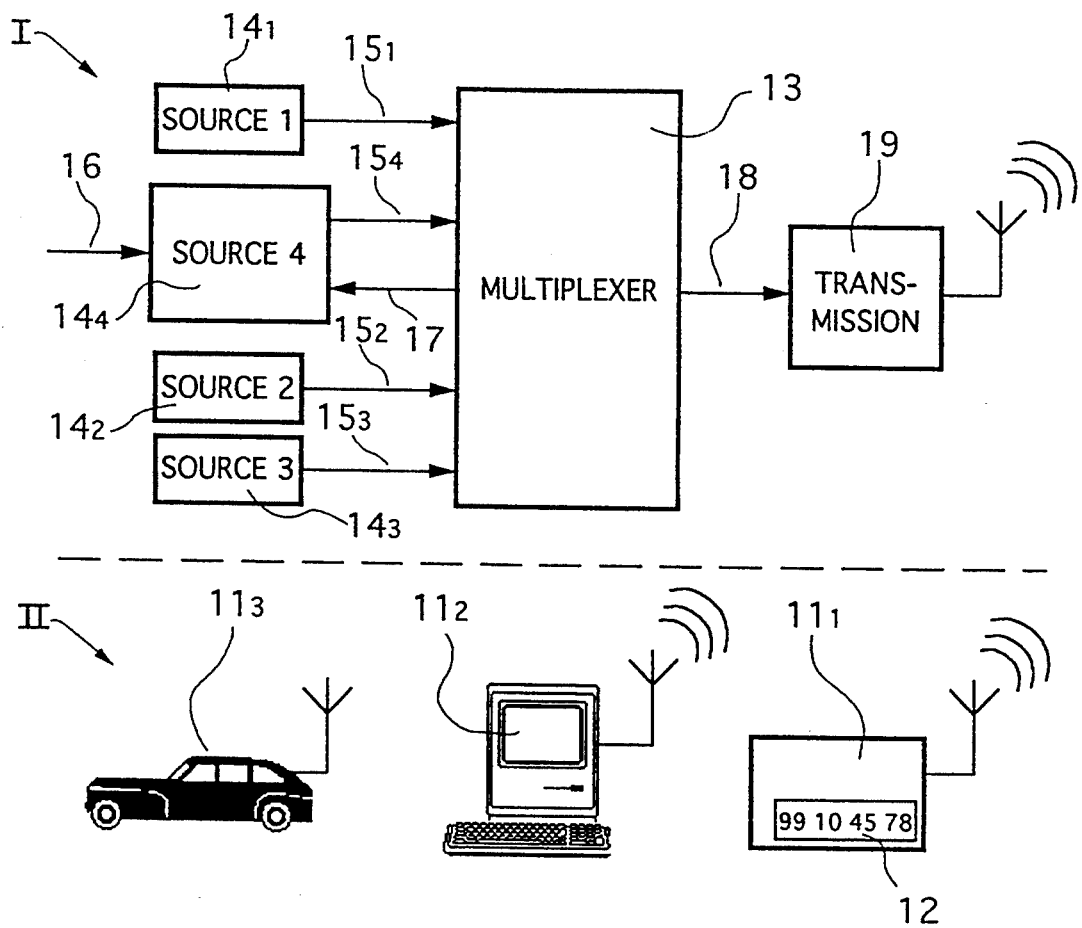
FIG. 1 shows a schematic view of a complete radio paging broadcasting system according to the invention.

FIG. 1 illustrates a complete broadcasting system according to the invention. This system includes a transmission part I and a reception part II.

The reception part II comprises a plurality of receivers $11_1$ to $11_3$ which may be of varied types. Thus, the following have been shown (without being drawn to scale) by way of examples:

- a standard pocket paging receiver $11_1$, that can be used to receive and display an alphanumerical or digital message 12 such as a telephone number to call;

Simpler paging receivers that enable solely the emission of a visual and/or sound signal upon reception of a message are also envisaged. Besides, as shall be seen here below, improved paging receivers, enabling the display of images and/or documents are also provided for;

- a portable microcomputer $11_2$ that can be remote-loaded, liable to receive various radio paging data elements. It is thus possible, for example, to send any type of document to a person or group of persons who are on the move. This person or group can then use the document, modify it, print it etc.;
- an automobile $11_3$ fitted out with a radio paging receiver that remains in operation even when the automobile is at a standstill.

The invention can be applied preferably in the case of mobile paging receivers but does not exclude the possibility of a fixed paging receiver.

The transmission part I comprises first of all a multiplexer 13. This multiplexer receives digital data coming from different sources $14_1$, $14_2$, $14_3$ and $14_4$, and organizes this data in the form of data frames. An exemplary frame structure is described in detail here below with reference to FIG. 4.

The data sources $14_1$ to $14_3$ may be, for example, digital audio programs, television programs or telematics-related programs. The data source 144 is a source of radio paging messages.

Although only one radio paging source $14_4$ is shown, it is clear that several distinct sources may be used, possibly with distinct levels of priority. In this case, the priorities will be managed for example by the multiplexer 13.

The radio paging source $14_4$ receives (16) the messages to be sent in a standard way, by means of a telephone set or a teletext terminal. The sender of a message calls the source $14_4$ and gives it the subscriber number of the addressee and the associated message.

Other types of links may naturally be envisaged. Thus, notably in the case of the transmission of documents or images, advantageously, the ISDN (integrated services digital network) system or even a specialized line will be used.

Furthermore, as the case may be, this radio paging source $14_4$ may possibly manage a vocal message system and/or a telematic message system which may be consulted by the possessor of a paging receiver upon reception of a message to obtain complementary information elements.

The links $15_1$ to $15_4$ among the different data sources $14_1$ to $14_4$ and the multiplexer 13 may, without distinction, be direct links or use any type of transmission network (telephone network, specialized network, RF links, satellites etc.). It is therefore quite possible for the sources $14_1$ to $14_4$ and the multiplexer 13 to be located at different geographical locations.

If the radio paging data elements $15_4$ given by the source $14_4$ have to be synchronous with the frame that is currently being prepared in the multiplexer 13 (as shall be seen hereinafter, only certain frames can convey a message designed for a given receiver), the multiplexer 13 gives the source $14_4$ an information element 17 on synchronization. This information element is advantageously the number of the frame that is currently being prepared or the number of the next frame.

If the multiplexer 13 itself manages the assigning of the messages to the frames (it may, at any instant, receive a message and the number identifying its addressee), the information 17 on synchronization is not necessary. The link $15_4$ then contains directly the frame number or numbers in which the information element must be inserted.

The frames are then directed (18) to the transmission means 19. These transmission means may be of any known type, adapted to the symbols to be sent out.

The principles of the COFDM modulation technique are briefly recalled here below by way of an example.

As has been described notably in the French patent No. 86 09622 dated 2nd July 1986 and filed on behalf of the same Applicants, and in the article by M. Alard and R. Lassalle, "Principes de modulation et de codage canal en radiodiffusion numèrique vers les mobiles" (Principles of Modulation and Channel Coding for Digital Broadcasting for Mobile Receivers), EBU review, No. 224, August 1987, pp. 168–190, the digital broadcasting system COFDM is based on the joint use of a channel coding device and a method of modulation by orthogonal frequency multiplexing.

The channel coding uses a convolutional code.

The modulation method proper of this known system makes it possible to overcome problems related to the frequency selectivity of the channel. It consists in carrying out the distribution of constituent digital elements of the data signal in the frequency-time space and in simultaneously sending sets of digital elements on a plurality of parallel broadcasting channels by means of a frequency multiplex using orthogonal carriers. In particular, this type of modulation makes it possible to avoid a situation where two successive elements of the data train are sent at the same frequency.

In a known way, the data elements are organized in successive frames, for example according to the method described in the patent application No. 90 16383 filed on 19th December on behalf of the same Applicants.

Each frame is constituted consecutive symbols, a symbol being a set of orthogonal carrier frequencies, each modulated by one or more binary elements and sent simultaneously.

These frames are constituted by elementary units which are one or more consecutive symbols or portions of consecutive symbols. These elementary units have a fixed format that is identical for all the units.

They may correspond to a whole number of units but this is in no way obligatory. It is quite possible to choose any elementary size according to need.

Hereinafter, for reasons of simplification, we shall consider the special case where an elementary unit corresponds to a symbol. Furthermore, the word symbol shall be used routinely in place of the term "elementary unit". It is clear, however, that this particular case is not restrictive.

The frames are then sub-divided into channels. A channel is therefore constituted by a sequence of one or more consecutive symbols (elementary units) which are always located at the same position on all the frames. This structuring can be reconfigured as a function of needs.

Figure 2:
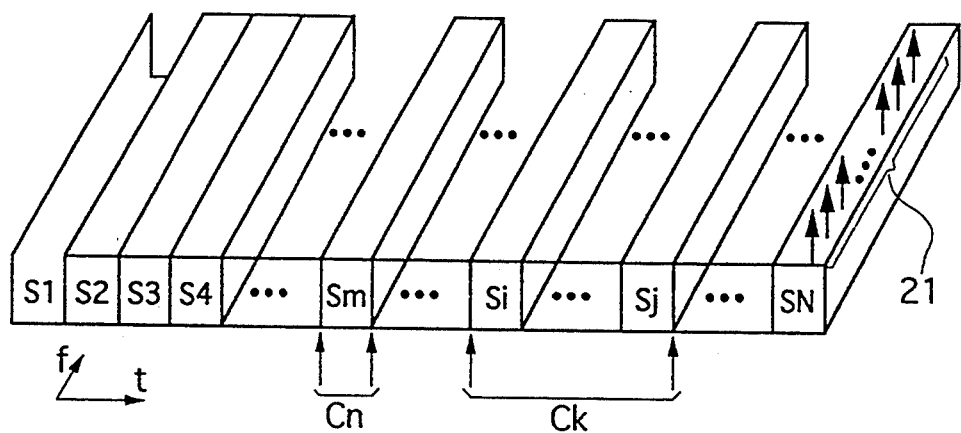
FIG. 2 shows an exemplary structuring of a COFDM frame in the form of channels according to a technique that is known per se.

FIG. 2 shows an example of an organization such as this, showing channels constituted by a whole number of symbols.

Each frame starts advantageously with three particular symbols S1, S2 and S3 whose role is specified hereinafter. It then has a number of useful symbols S4 to SN, each comprising N modulated orthogonal carriers 21.

The symbol S1 is a zero symbol enabling, firstly, the performance of an analog synchronization and, secondly, the performance of the spectral analysis of the broadcasting channel. The symbol S2 is a second synchronization symbol constituted by a non-modulated multiplex of all the carrier frequencies, with a substantially constant waveform. This enables a more precise resetting of the synchronization by analysis of the pulse response of the channel. The role and mode of preparation of these symbols S1 and S2 are described in the French patent application No. FR 88 15216 filed on 18th November 1988 on behalf of the present Applicants.

Naturally, these symbols of synchronization are not obligatory in the invention.

The symbol S3, for its part, is a wobbulation symbol giving a phase reference for the demodulation of each carrier of the following symbols, when these symbols are demodulated differentially. As the case may be, the phase reference function fulfilled by S3 could be fulfilled by the symbol S2, the two symbols S2 and S3 being "merged", so to speak, into a single symbol S2 (i.e. TFPC or Time Frequency Phase Control).

The allocation of the resource is done by the assigning, to each application, of one or more channels (one application corresponding for example to one of the data sources of FIG. 1) and by fixing the size (in terms of number of symbols) of each of these channels.

Thus, to a first application requiring only one symbol, there is applied the channel Cn corresponding in all the frames to the symbol Sm. By contrast, for another application having a greater bit rate, the channel Ck corresponding to the consecutive symbols Si to Sj is defined.

Figure 10:
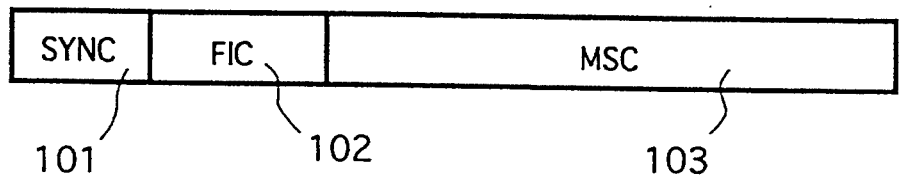
FIG. 10 illustrates the general architecture of a COFDM frame according to the invention.

According to the invention, a channel is thus reserved, at least partially, for the conveying of radio paging data. FIG. 10 gives a schematic view of the structure of a frame according to the invention.

This frame may be divided into three sub-sets:
- a synchronization part 101 that can contain, for example, an empty symbol of analog synchronization and a symbol of temporal and frequency synchronization or time frequency phase control (TFPC);
- a Fast Information Channel (FIC) 102 in which the data elements are not temporally interleaved;
- a part 103 of temporally interleaved data elements (MSC or main service channel).

Figure 3:
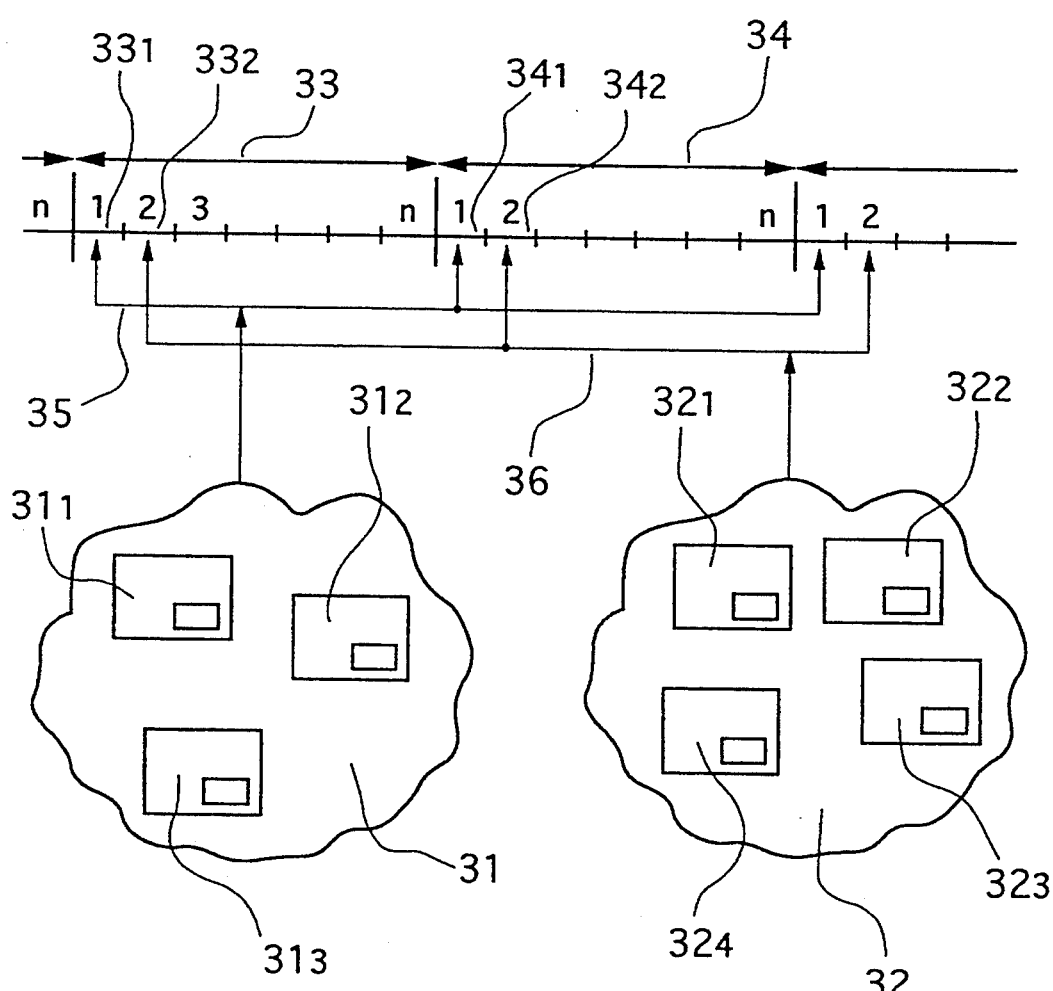
FIG. 3 illustrates the principle of the numbering of the frames and the association of frame numbers with each radio paging receiver, according to the invention.

FIG. 3 illustrates the general principle of the invention.

The subscribers, represented herein by their paging receivers $31_1$ to $31_3$ and $31_1$ to $32_4$, are assembled in families (respectively the families 31 and 32) so as to obtain the most efficient possible distribution of the calls and prevent major delays in broadcasting.

This assembling in families takes account notably of the type of subscription chosen (for example, the level of priority), the geographical coverage for which the subscription has been taken out in the case of cellular broadcasting networks etc.

If there are several independent broadcasting networks coexisting or participating in the radio paging service, the families are distributed among these different networks according to the subscriptions that have been taken out.

The data frames $33_1$, $33_2$, $34_1$, $34_2$ are grouped together in transmission cycles each constituted by a same number M of frames. The period of a cycle is of the order of one to two minutes for example.

A particular frame $33_1$, $33_2$ (or a group of frames) is assigned to each family of subscribers 31, 32 of the transmission cycle 33. Thus, each receiver $33_1$ to $33_3$ of the family 31 is liable to find the messages intended for it solely in the first frames $33_1$, $34_1$ of each cycle 33, 34.

In this way, an intermittent working of the receivers is possible. The receivers of the family 31 are activated only to read (35) the first frames of each cycle. Similarly, the paging receivers of the family 32 read (36) only the second frames $33_2$, $34_2$ of each cycle 33, 34.

According to the essential characteristic of the invention, this function is made possible by the numbering of the frames. Each frame of a cycle is assigned a distinct number. The frame number or numbers associated with a family are known by each receiver of this family. They are part of the identification of these paging receivers.

These numbers enable the paging receivers to get synchronized and then to regularly monitor the frame or frames that are allocated to it, to ascertain that there is a message addressed to them. They enable a paging receiver to find out very swiftly if it has been desynchronized by a simple comparison of the number read with the allocated number.

The resynchronization, or the initial synchronization, is also very easy. The receiver determines the synchronization error between the number read and the number allocated, temporally shifts the instant of activation as a function of this synchronization error and then gets activated regularly at the right instants.

To facilitate the working of the receivers and limit their electrical power consumption, the frame number is preferably placed at the start of the frame. In the case of a COFDM frame (FIG. 2), it will be placed in the first useful symbol following the synchronization and wobbulation symbols S1 to S3.

To achieve the same goals, it is also desirable that the radio paging messages should directly follow the frame number, in the same symbol and possibly the directly following symbols.

A message may also be distributed over several starting zones of consecutive frames, if the capacity of a frame is insufficient.

If the useful radio paging data elements cannot be placed directly in the first symbol of data elements S4 (for example for reasons of standardization), then provision will be made, in this first symbol, for assistance information elements indicating the presence of paging messages to follow. Thus, should there be no message present, the receivers will not perform any unnecessary task of searching for a message, and will immediately return to a state of standby watch.

In other words, the first symbol comprises firstly the frame number and secondly an information element on the presence of a message which may be either the message itself or a presence-indicating flag.

Figure 4:
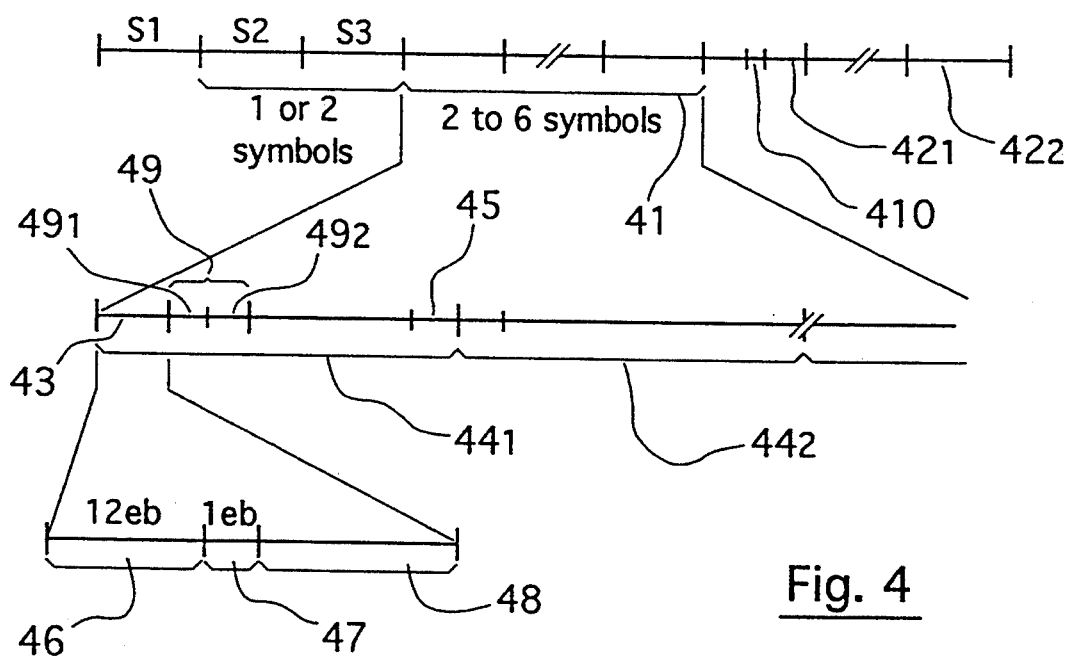
FIG. 4 shows a detailed example of a frame structure according to the principle illustrated in FIG. 3.

An exemplary frame according to the invention is shown in FIG. 4.

This frame comprises, in a standard way, first of all the symbols S1, S2 and S3 described here above. The symbols S2 and S3 may be combined into a single symbol, fulfilling the same functions of temporal and frequency synchronization or time frequency phase control, generally known as TFPC.

A first channel 41, called a radio paging channel or more generally a fast information channel, directly follows the symbols S1 to S3. Different specific channels $42_1$, $42_2$ corresponding to different applications come thereafter.

The fast information channel 41 is constituted, for example, by 2 to 6 successive samples. It comprises a header 43 and a set of data elements that are organized, for example, in successive information units $44_1$, $44_2$ . . . . Advantageously, parity control or cyclical redundancy check (CRC) bits 45 are associated with each information unit.

The header 43 bears firstly the number 46 of the current frame, coded for example on 12 binary elements and different indicators on the data present in the fast information channel:

a flag 47 indicating the presence of information units in the frame;

several flags 48 indicating the presence of information elements corresponding to a given service.

Indeed, the fast information channel 41 is not reserved solely for the radio paging data elements (corresponding to one of the services) but can also relate to miscellaneous information such as, for example, a description of the structuring of the frames into channels.

The organization of the information units, which is not specified here, is clearly a simple matter of convention. Furthermore it is clear that the very structuring of the frame is given by way of an indication, and that many variants may be envisaged.

The COFDM technique proposes that the data elements should be temporally and frequentially interleaved so as to ensure maximum independence between the data transmitted. However, according to the invention, the fast information channel shows no temporal interleaving.

This indeed enables a faster decoding of the data elements (owing to the absence of de-interleaving) and notably a direct decoding of the first data elements, relating notably to the header of the frame.

Furthermore, this makes it possible to limit the processing operations to be done, and hence to reduce the electrical power consumption of the paging receivers. Indeed, most of the time, there is no message intended for a given receiver (the presence of a message is a rare event, compared with the duration of a cycle). The only operation to be performed, therefore, is the reading of the frame number, then the verification that there is no message present. Owing to the absence of interleaving, these operations are fast and simple.

Advantageously, the radio paging data elements are encoded by means of a detector code or error corrector code. According to a preferred embodiment of the invention, a systematic convolutional code is used. For example, this code may be a code with a constraint length 7 and a fixed efficiency rate of $\frac{1}{2}$, using the generator polynomials 0155 and 0117 (in octal encoding).

The radio paging data elements contained in the fast information channel can naturally have only a limited size. They may therefore be in the form of short alphanumerical messages (for example a telephone number).

However, the method of the invention makes it possible to transmit far longer messages (images, documents, etc.) to top-of-the-range receivers. To this end, the message 49, contained in the radio paging channel designed for one of these receivers, comprises first of all (as of course in any message), an information element $49_1$ identifying the addressee receiver 1 and a useful information element $49_2$ comprising designators designating complementary data elements 410 stored in another data channel $42_1$.

These designators $49_2$ designate, for example, a set of packets present in a specialized channel $42_1$ reserved (at least partially) for this use. The data elements present in this channel, just like all the data elements present in the channels $42_1$, $42_2$ (i.e. all the channels other than the fast information channel 41) are temporally and frequentially interleaved.

The designators therefore designate the start (and optionally the end) of a block of information elements contained in one (or more) complementary channels of a same frame or of any other frame (or several frames) of a same cycle, or again, by integrating an absolute time information element which is also found in the fast information channel, of any frame (or of several frames) conveyed by the COFDM signal constituting the medium. The chaining of the data elements of the block of information follows the rules defined for all information elements conveyed by the COFDM signal.

More generally, the technique of designators may be used by different radio paging services, for example for a temporal division of these services.

It has to be noted that this technique is very different from that described in the document WO 86/03645 already discussed, based on a standard approach consisting of a chaining operation that uses the numbering of the time intervals.

It is therefore necessary for the top-of-the-range receivers to include de-interleaving means. However, these means are implemented rarely (only when a message intended for a user is present). For the rest of the time, only the start of the fast information channel is decoded.

The top-of-the-range receivers therefore include two substantially independent units:
- firstly, a radio paging unit that periodically scrutinizes the fast information channel. These are actually reception means corresponding to the means present in the simpler radio paging receivers described here below;
- secondly, a standard COFDM reception unit to decode the complementary data elements. These are standard means (identical to those existing in known COFDM receivers) which shall be described hereinafter.

A top-of-the-range receiver may therefore incorporate a display screen (for example, a flat screen for portable receivers) enabling the display of an image or a text. It is also possible to provide for a keyboard by which text can be made to move across the screen.

This screen can also be accompanied by a printer (or replaced by this printer). More generally, any retrieval and storage means (such as magnetic diskettes, hard disks, memory cards etc.) can be associated with these top-of-the-range receivers.

Besides, as already mentioned, applications other than those entailing calls to persons can be envisaged. For example, the receivers may be portable microcomputers, that can be remote-loaded automatically by means of data elements sent out in the complementary radio paging channels.

It must be noted that, in this particular case, the cycle times (recurrence period) may be far greater (for example equal to some hours). By contrast, it is possible to distribute the data elements to be transmitted on many frames, notably in the case of very large documents.

By a skilled choice of the numbering of the frames, it is possible to make several services having different recurrence periods cohabit with one another. This can be done either by associating several frame numbers with the receivers of services having a low recurrence period or by integrating the current time in the logic system used to take the frames into account, so that a given receiver does not take into consideration all the frames having a same predetermined number that it receives during successive cycles, but only those frames that it receives at predetermined periods of time, i.e. as a function of the current time of reception of the frame.

A description shall now be given of different types of receivers that can be used according to the invention.

First of all, there is provision for continuously operating receivers, for cases where the problems of power supply have been resolved for other reasons (these are non-autonomous receivers). Receivers of this type entail no problems when compared with known radio broadcasting receivers for the DAB system.

Indeed, the methods of synchronization may be identical. Furthermore, the decoding is not done permanently but only on the frames assigned to the receiver.

Thus, the processing operations to be carried out are done on a limited number of symbols of each cycle of frames (some tenths of seconds at most in one or two minutes). They can therefore be done on a deferred basis, by means of a single medium-range data processor.

Figure 5:
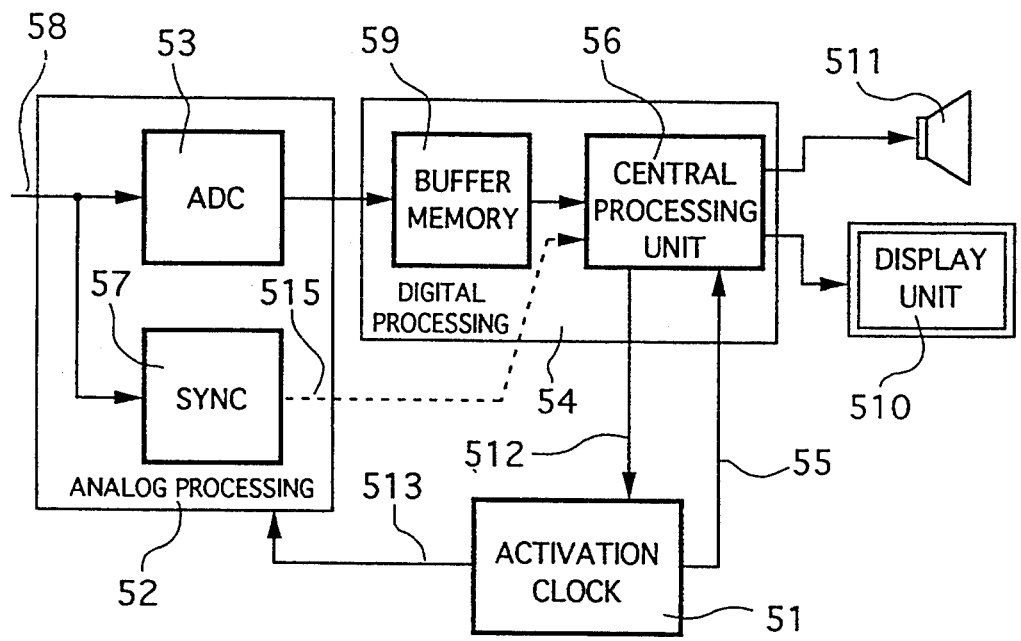
FIG. 5 is a general block diagram of a receiver of the system of FIG. 1.

The most common case, however, is that of receivers with discontinuous or pseudo-continuous operation. FIG. 5 is a general block diagram of a receiver such as this (apart from the timer, and hence the watch function, this FIG. 5 can also be applied to continuously operating receivers).

The portable (or more generally autonomous) receivers therefore have a standby watch function, in such a way that these receivers are in activity only at the instants of transmission of a frame that is assigned to them. The rest of the time, only a periodic activation clock 51 with very low consumption is supplied with power. Thus the receivers may have a high degree of autonomy.

The role of this clock 51, therefore, is to order the activation of the different processing means of the receiver, at predetermined instants. If the processing operations are done on a deferred-time basis (as shall be explained hereinafter), and if they are done for a reasonable size of buffer memory, then this clock must carry out an activation with a precision of the order of 5 ms to the minute.

The processing means of a receiver can be divided into two major parts:
- the analog processing means 52, including the analog/digital conversion means 53 (described in greater detail hereinafter with reference to FIG. 7);
- the digital processing means 54 (described in greater detail hereinafter with reference to FIG. 8).

The activation clock 51 regularly activates (55) at least one digital central processing unit 56 which manages the overall functioning of the receiver and carries out the different digital processing operations.

The analog processing means 52 contain notably synchronization means 57 for synchronization with the start of a frame. These means 57 send a synchronization information element 515 to the central processing unit 56. The central processing unit 56 is thus in a position to guide all the processing means as a function of the synchronization information element, and notably to open the processing windows of the received signal in good time. The synchronization information element is generated by the synchronization means 57 by detection of the symbol S1 (FIG. 2) in the received signal 58.

The symbols of the radio paging channel are then digitized, by means of the analog/digital converter (ADC) 53, and then stored in a buffer memory 59. This buffer memory enables the processing operations performed by the central processing unit 56 to be carried out in deferred time by all or a part of the symbols. Naturally, if the central processing unit is capable of carrying out these processing operations in real time, the buffer memory 59 is eliminated, and the data elements digitized by the ADC 53 are transmitted directly to the central processing unit 56.

The role of this central processing unit is to analyze the data received and, if necessary, to extract the data elements intended for itself therefrom. This message is then presented, for example, to the possessor of the receiver on a display unit 510. A sound signal 511 can also be sent.

The central processing unit 56 also checks the operation of the clock 51. If the number of the frame being processed does not correspond to a number assigned to the receiver, it sends an information element 512 for the resetting of the clock.

In practice, this central processing unit 56 may be constituted:
 by a microprocessor (for example of the MOTOROLA family 68 000 (registered marks));
 a digital signal processor (DSP), for example of TEXAS INSTRUMENTS 56156 processor (registered marks),
 the association of a microcontroller and of a signal processor.

In the third case, each component works only when this is necessary for its operation, so as to limit power consumption.

More generally, it is advantageous for each part of the receiver to be powered only when this is necessary. Thus, FIG. 5 shows two distinct activation commands 55 and 513 generated by the clock 51, designed respectively for the digital means 54 and for the analog means 52. In practice, the command 513 may also be sent by the central processing unit 56.

Figure 6:
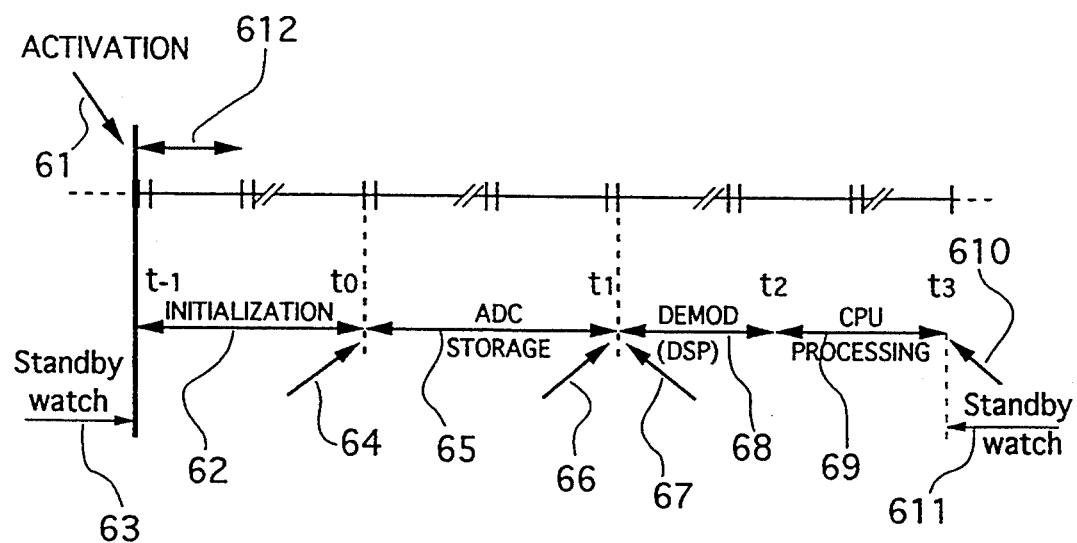
FIG. 6 illustrates the operation, in time, of the elements of the receiver of FIG. 5.

Furthermore, as illustrated in FIG. 6, the breakdown of the selective activation can be done with even greater precision.

Thus FIG. 6 illustrates an exemplary distribution in time of the working of a receiver. This is, of course, a particular, non-restrictive example.

The activation clock carries out the activation 61 of the receiver, or more specifically the frame synchronization and AGC acquisition means, at the instant $t_{-1}$. This is in fact an initialization operation 62 done on at least two frames preceding the frame or frames associated with the receiver (the arrow 612 illustrates the duration of a frame).

Earlier, the receiver was in a state of total standby watch 63 (only the clock was powered).

When the initialization operation 62 is over, the different active means are no longer powered. At the instant $t_0$ corresponding to the (first) frame associated with the receiver, a command 64 for the activation of the analog/digital converter is generated. For the duration 65 corresponding to the n consecutive flames associated with the receiver (it being possible, naturally, for n to be equal to 1), the starting zones of these flames, i.e. notably the radio paging channels, are stored in the buffer memory.

Then, at the instant $t_1$, a command 66 for the stopping of the analog part and of the ADC is sent. At the same instant $t_1$, an activation command 67 is sent to the digital central processing unit which carries out the demodulation of the data elements 68 and then the processing of the applications 69.

At the end of the processing operations (instant $t_3$), a command 610 for deactivating the receiver is sent, causing a return to the standby watch state 611.

Should two processors be present, the DSP is activated from the instant $t_1$ to the instant $t_2$, for the demodulation 68, and the microcontroller is activated from the instant $t_2$ to $t_3$ for the processing of the applications 69.

The duration of activation of the receiver (duration $t_{-1}$ to $t_3$) is at most in the range of some seconds, for a cycle time (recurrence period) of the order of one or two minutes.

It must be noted that several processing methods may be envisaged:
 operation in real time on all the frame synchronization symbols, with memorization of the useful symbols at the end of the synchronization phase (this is the case illustrated in FIG. 6);
 operation in real time on the two frame synchronization symbols (zero symbol S1 and AFC S2) with memorization of the useful symbols including the temporal synchronization symbol (wobbulation symbol S3);
 operation in deferred time (if the problems of precision of the frequencies are also resolved and if the detection of the frame synchronization is sure);
 operation in real time on all the symbols needed for the radio paging service (necessary for top-of-the-range services). In this case, the decoding of the binary information is also done in real time. Consequently, it is possible to simplify the systems of synchronization with the service. In the processing, it is possible to look at each frame number as well as the contents of each symbol reserved for the radio paging, note a call and know how to identify it.

Figure 7:
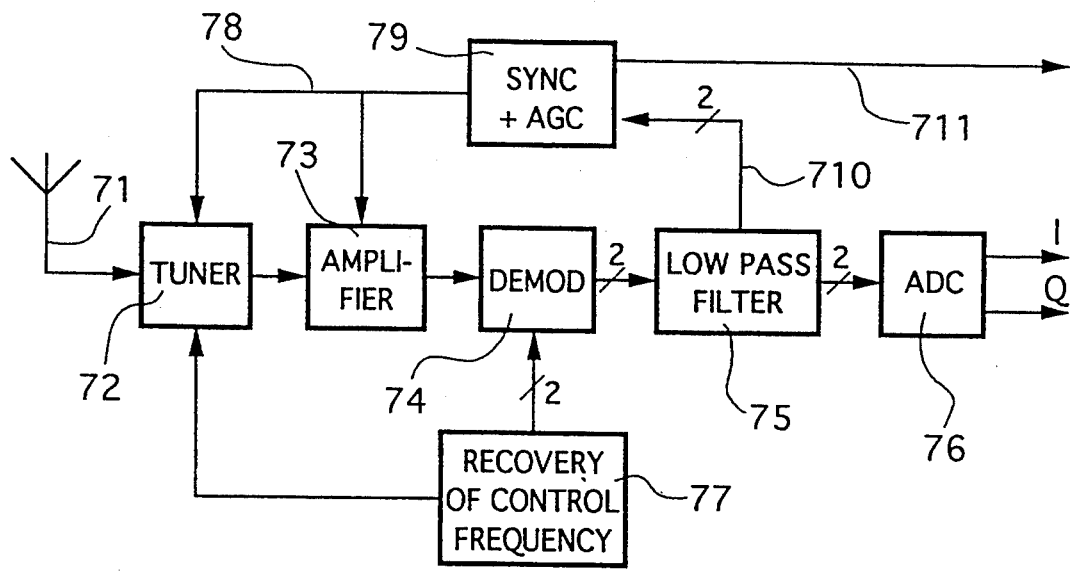
FIG. 7 shows the detailed structure of an advantageous embodiment of the analog part of the receiver of FIG. 5.

A more detailed description is now given of the structure of the analog part of a receiver, with reference to FIG. 7.

The signals sent are picked up by means of an antenna 71 and sent to a tuner 72. It is wise to choose a tuner that incorporates also the functions of a local oscillator. The oscillation frequency should be capable of being controlled by the microcontroller handling the radio paging application.

The tuner transmits the received signal to an intermediate frequency amplifier 73. This amplifier preferably uses a surface wave filter (SWF) whose filtering template simplifies the correction of the offset of the local oscillator by digital computation before Fast Fourier Transform (FFT).

The signal is then demodulated in quadrature in a standard way. It is also possible to remove the need for the demodulation of one of the signals by making the digital processing operations complex. The main advantage of this approach for this function is that it does not require the generation of a second demodulation signal phase-shifted by 90°.

Other demodulation techniques can be envisaged. These are notably:
 digital demodulation of the two signals, the I and Q signals, after a transposition of the spectrum around a carrier that is low enough to enable working in digital mode;
 analog or digital demodulation of only one of the signals;
 transposition around a low-frequency carrier of the spectrum and a processing of the demodulation directly in digital mode.

The demodulated I and Q components delivered by the demodulator 74 are filtered by means of a low-pass filter 75 that enables the elimination of the high frequency residues present in the signals but also, and above all, the preparation of the signals for the analog-digital conversion.

The filtered signals are finally converted into digital data elements by the analog/digital converter 76. The analog/digital conversions can be carried out by a single converter working at twice the normal frequency if a fast analog multiplexer is inserted before this converter, or by two converters in parallel.

The recovery 77 of the control frequency is carried out, for example, by a high-precision quartz element or from a AFC reference signal (symbol S2).

The automatic gain control 78 is generated by a synchronization and AGC extraction module 79 by means of the two I and Q components 710. A voltage proportional to I*I+Q*Q controls the AGC inputs of the tuner 72 and the intermediate frequency amplification part 73.

Advantageously, the AGC signal 78 before filtering contains an information element on the disturbances introduced into the channel.

Besides, from the extraction module of the AGC signal 79, it is possible to extract the frame synchronization signal 711 by filtering and passage into a comparator. This technique may be envisaged for continuously operating or pseudocontinuously operating receivers (for the processing of the AFC and wobbulation symbols in real time).

Figure 8:
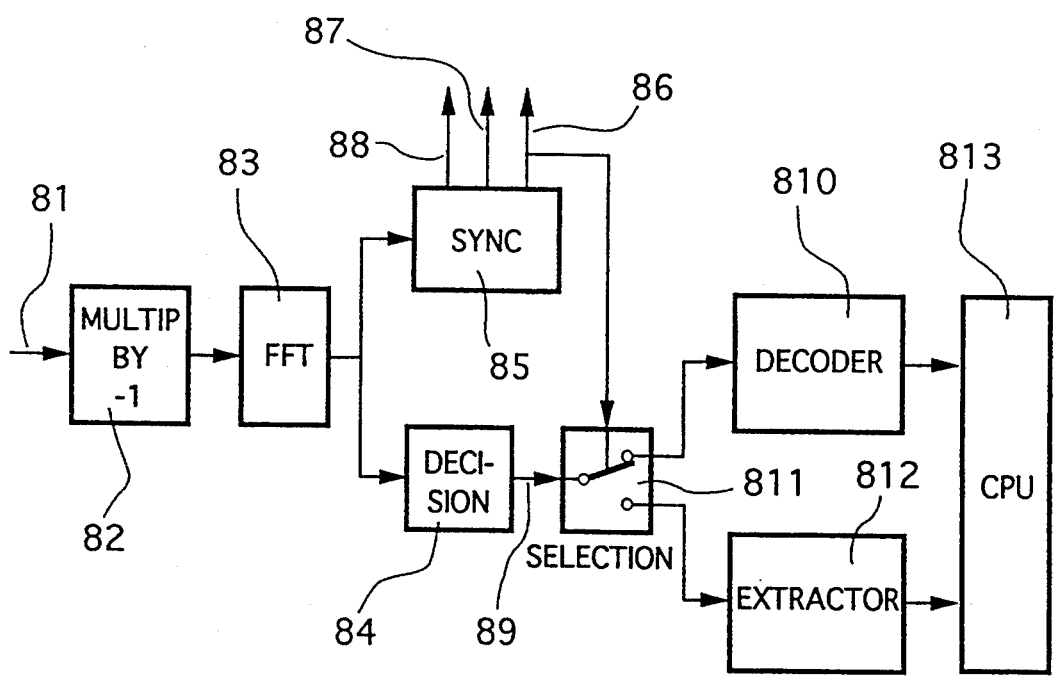
FIG. 8 shows the detailed structure of an advantageous embodiment of the digital part of the receiver of FIG. 5.

FIG. 8 shows a block diagram of the digital part of the receiver. The digital data elements 81 are first of all demodulated.

In a conventional way, the demodulation of the data elements 81 combines several processing operations. The first consists in multiplying (82) the samples received by −1 to retranspose the spectrum of the signal and, for the symbol dedicated to the AFC, in carrying out the multiplication of all the samples by a number that depends on the position of the sample in the symbol (Hanning filtration window).

Then a Fast Fourier Transform (FFT) 83 is carried out on the samples (outside the guard interval) of all the symbols.

The result of this processing is exploited differently if a symbol is a synchronization symbol or a data symbol. For the latter, the phase of the samples is exploited in a decision module 84 to determine the value of the dibits (two binary elements) as a function of the value of the phase of each sample of the previous symbol (in the case of a 4-PSK or 4 phase-shift keying type of differential coding).

The first data symbol has a strategic position for it does not entail any additional computation of FFT. This is why at least the header is placed in this first symbol.

The processing operations 85 on the synchronization symbols are specific to the function to be fulfilled. The zero symbol of synchronization 51 enables the estimating of the quality of the channel 86 (especially the detection of parasitic frequencies or the noise level). The symbol 52 called the AFC symbol enables the estimation and hence the correction of the error on the carrier frequency 87. The symbol 53, called the wobbulation symbol, enables the working window 88 of the FFT to be located with precision. It enables the detection also of the presence of strong echos. These two symbols may be combined, if necessary, into a single symbol. The processing of the AFC signal is necessary if the frequency resettings are processed in digital mode.

The demodulated data elements 89 are then presented to the input of a decoder 810 for the processing of the convolution done at transmission. The estimation of the quality of the transmission channel may be used here either to simplify the processing operations if a systematic code is used or to weight the values presented to a soft decision Viterbi decoder.

Thus, the selection module 811, in taking account of the estimation information 86, may choose not to carry out the decoding if the transmission quality is good. This is easy if a systematic convolutional coding is used. The useful data elements therefore exist in plain form among all the data elements received. It is therefore enough, in the extractor 812, to separate the useful data from the redundancy data. This simple operation is faster and consumes less power than the Viterbi decoding.

For top-of-the-range services, the demodulation must also relate to the channel containing the accompanying data elements. It is therefore added to the processing of the de-interleaving before the passage into the Viterbi decoder.

In the radio paging application, the output of the binary information elements (the trace-back of the survivors) can be done on the basis of a number of input values sufficient for all the decision bits of the application to be processed. This condition implies the placing of the information elements necessary for the radio paging at the start of the first symbol.

Figure 9:
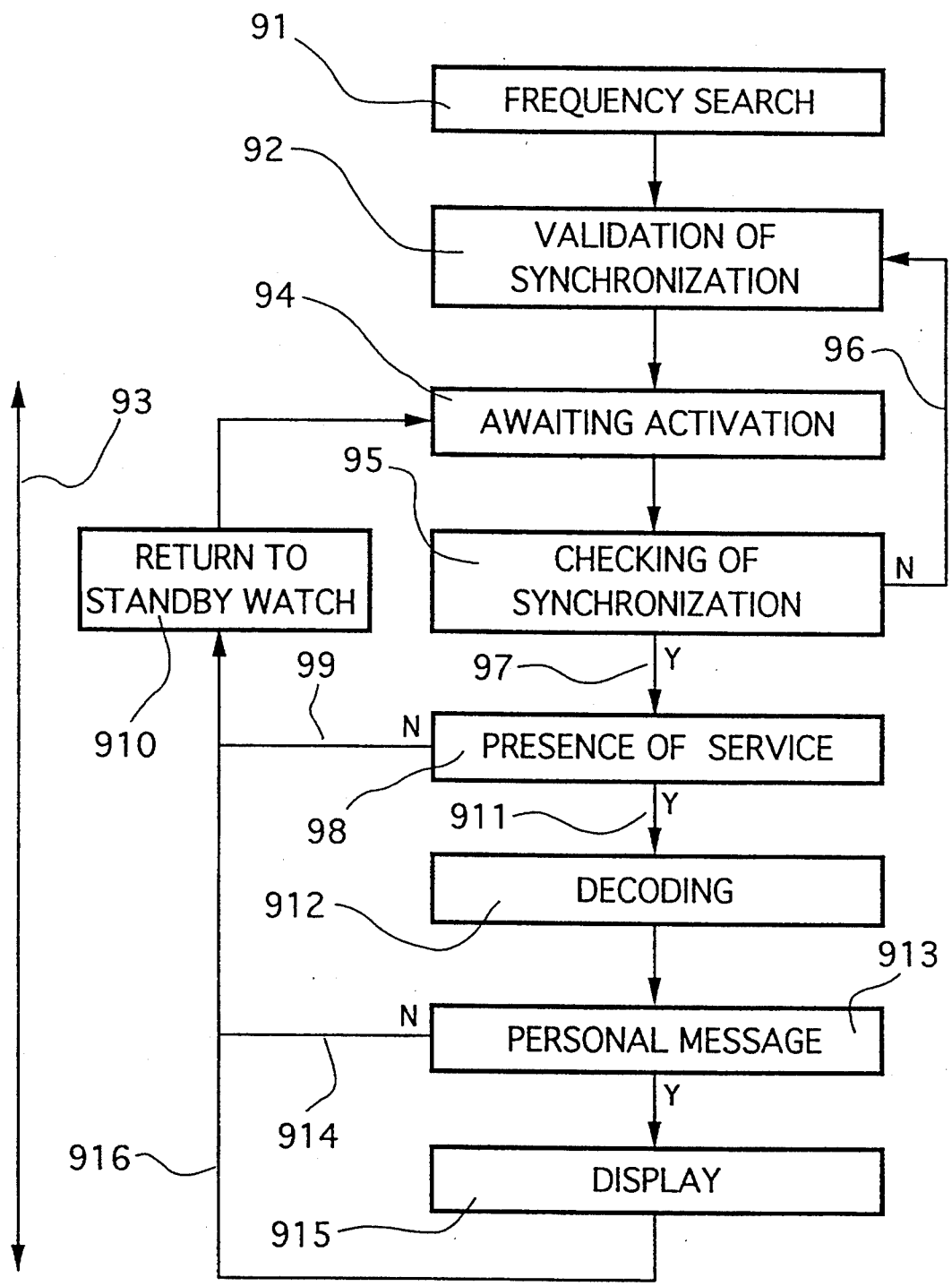
FIG. 9 is a flow chart illustrating the working of the processing means specific to the radio paging of the means of FIG. 8.

The decoded data elements are then transmitted to the radio paging processing unit 813, for which a preferred mode of operation is shown in FIG. 9.

Naturally, the implementation of what follows will be substantially different, depending on whether the receiver is one with continuous operation, pseudo-continuous operation or deferred operation.

In the case of a cellular network, the receiver first of all makes a search, from among the frequencies assigned to it, for that frequency (91) at which the signal-to-noise ratio is the most favorable one, before carrying out the processing operations that follow.

The receiver must then, in a first phase 92, get synchronized. To this end, after locking into the DAB frame and memorizing at least two frame starts, it decodes the frame numbers for which it has memorized the useful symbols of synchronization, as well as the first symbols of data elements. After verifying the coherence of the frame numbers received, and doing a computation on the time lag between these frames and the frame or the frames dedicated to it, it validates a timer enabling activation shortly before the appearance of the frames that are intended for it. The system then goes into cyclical operation (the repetition of the operating cycle 93). The receiver is most usually in a state of awaiting activation 94 until the timer orders the activation.

At this instant, the first operation relates to the checking 95 of the synchronization. The receiver detects a desynchronization if the frame numbers that it decodes are not those expected. In this case (96), it resets itself in the previous state 92.

If it is well locked (97), it looks (98) at the "presence of services" fields (if this field is present) or at the start of the first symbol of data elements to see if there is a radio paging information element. If this is not the case (99), then the receiver goes back to a deactivated state (910) and waits (94) for the next cycle. If not (911) it decodes (912) the radio paging information.

Similarly, it ascertains (913) that the message is intended for it. If the message is not intended for it (914), it becomes dormant. If the message is intended for it, it presents it to the user (by means of a beep, display signal etc.) (915) and then goes back (916) to the deactivated state (910).

After the description of the characteristics of the invention, a reminder is given of the characteristics (which are known per se) of a COFDM signal broadcasting system applied to the particular case of the invention (selective activation of temporal interleaving).

The digital broadcasting system known as the COFDM (Coded Orthogonal Frequency Division Multiplex) system is described notably in the French patent No. FR 86 (09622) dated 2nd July 1986 and in the document by M. Alard and R. Lassalle, "Principes de modulation et de codage canal en radiodiffusion numèrique vers les mobiles" (Principles of Modulation and Channel Coding for Digital Broadcasting for Mobile Receivers), EBU Review, No. 224, August 1987, pp. 168–190.

This system is based notably on the combination of two main principles.

The first principle is the distribution of the information to be transmitted on a large number of carriers each modulated at a low bit rate, in order to reduce the effect of selectivity of the transmission channel (COFDM signal).

The second principle of the COFDM system consists of the correlation, by a coding method, of the consecutive information elements (canal coding) and in transmitting them to distant points of the time-frequency domain (the technique of temporal and frequency interleaving). The distance of these points is chosen so as to ensure statistical independence between two successive elements of a source signal.

The channel coding implements a convolutional code. Although the channel coding aspect is not directly related to the present invention, the principle thereof is described briefly in order to give a complete presentation of an exemplary radio broadcasting system that can implement the method of the invention. This is of course a simple, non-restrictive example.

The modulation method proper of this known system can be used to overcome the problems related to the selectivity of the channel in frequency. It consists in carrying out the distribution of the constituent digital elements of the data signal in the frequency-time space and in simultaneously sending sets of digital elements on a plurality of parallel broadcasting channels by means of a multiplex of frequencies using orthogonal carriers. In particular, this type of modulation can be used to prevent two successive elements of the data train from being sent at the same frequency.

Figure 11:
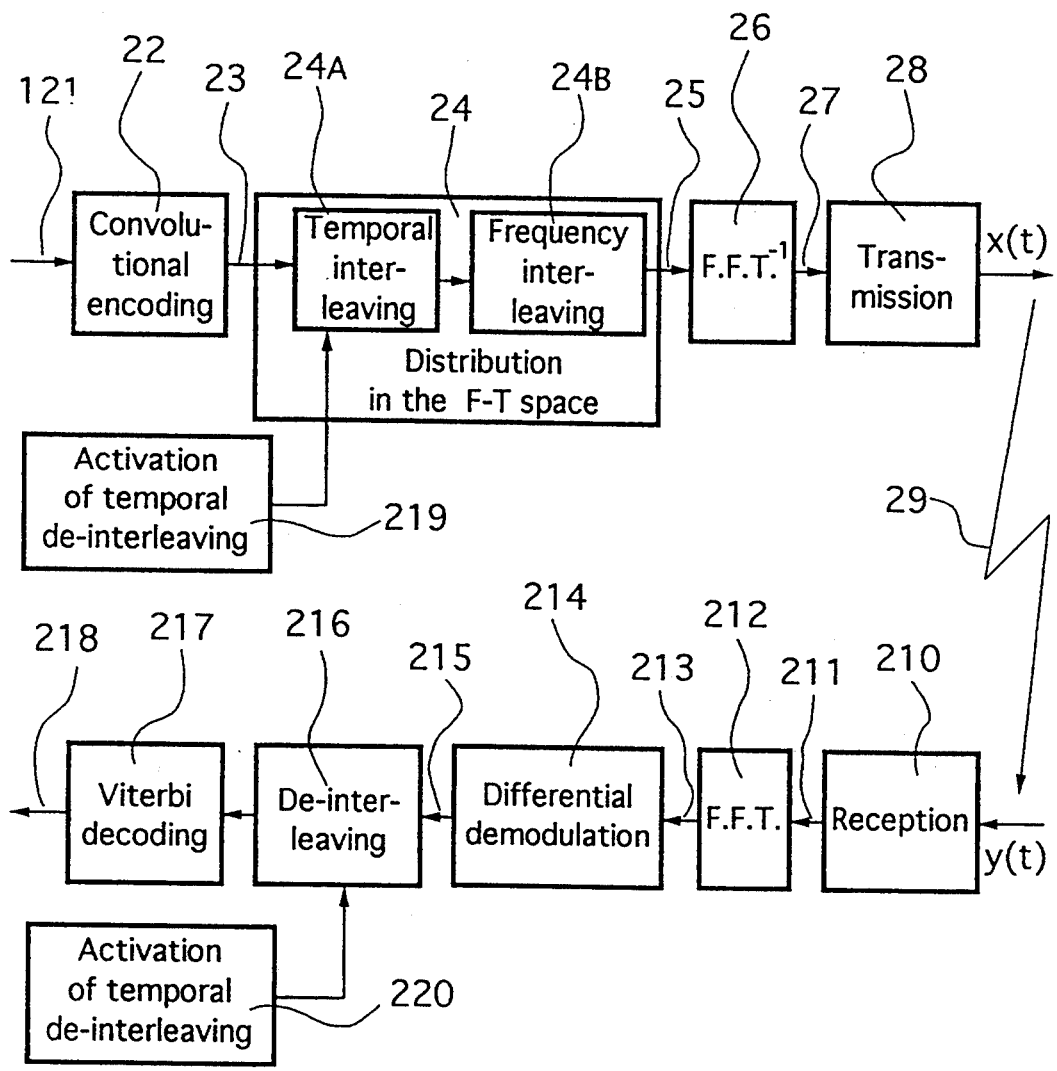
FIG. 11 shows a COFDM signal transmission system adapted to the invention.

FIG. 11 is a block diagram of a transmission and reception unit of a system implementing the COFDM technique.

Thus, the source digital data elements 121 to be transmitted a subjected to a convolutional encoding 22. The general principle of a coding such as this is the association, with each source value, of an encoded value that is dependent on this source value and on at least one of the values that precedes it. Owing to the link thus created between the encoded values, it is thus possible, at decoding, to reconstruct the sequence of the source values even when a received encoded value is false, by means of a maximum likelihood decoding such as a soft decision Viterbi decoding (i.e. a decoding that delivers an estimation of the received value and a weighting that represents the confidence that can be placed in this estimation).

Advantageously, an external code of the Reed-Solomon or CSRS (Cyclotomatically Shortened Reed Solomon Code) type may be concatenated with the convolutional code.

As already specified, the COFDM system relies on the simultaneous use of a plurality of carrier frequencies that are sent out simultaneously. The number N of carriers may be any number. In a standard way, the number of carriers is of the order of some hundreds (it could also be of the order of some units). Each of these carriers is modulated at a low bit rate (as compared with the bit rate needed for a corresponding single-carrier system). This enables a reduction in the effect of selectivity of the channel.

The total signal sent is therefore a wideband signal (occupying for example a band of some Megahertz). This wide band is an advantage in the case of systems designed to take advantage of multiple paths, such as the COFDM. Indeed, owing to the spread of the response of the transmission channel, it is highly improbable that a deep fading will simultaneously affect the entire signal.

For example, in an 8 MHz frequency band, it is possible to define 512 carrier frequencies separated by 15 625 Hz. Among these carrier frequencies, 448 are usable, after the elimination of the central frequency of the spectrum and of the side carriers (⅛th of the spectrum) to take account of the filtering constraints.

In this COFDM system, and contrary to the standard methods of frequency multiplexing, the spectra of the different carriers overlap one another. However, the complete signal verifies certain conditions of orthogonality that enable the separation of the information elements associated with the different carriers, for example by using the technique of the Fourier transform (as specified further below). In other words, the notion of orthogonality of the carrier frequencies underlies the fact the spectra of the carriers may overlap, provided that one of the spectra has its maximum power, i.e. at the precise frequency of the carrier corresponding to this spectrum, all the other spectra have zero power. The decoding is therefore not disturbed if this precise frequency is considered.

The intersymbol interference introduced notably by the multiple paths during the transmission may disturb this orthogonality. To avoid this problem, a guard interval is inserted between every two successive symbols sent. The duration of this guard interval is chosen so as to be greater than the spread of the pulse response of the channel.

The coding module 22 delivers the data elements coded $C_k$ 23 belonging to an alphabet of modulation. The choice of the alphabet specifies the type of modulation used. For example for a 4 phase-shift keying (4-PSK) type of modulation, the alphabet used is $\{1+i, 1-i, -1-i, -1-\}$. Many other types of modulation may be used, such as the 8-PSK modulation, 16 QAM modulation, or modulation by trellis coding according to Ungerboeck's method.

The encoded data elements 23 are then subjected to an operation 24 for distribution in the frequency-time space. This operation consists of the association, with each of the carrier frequencies, of the data elements selected from the sequence of the encoded data elements 23 so as to break, by shuffling, the correlation of the distortions undergone by the transmitted samples. The term "time-frequency space" is taken to mean a set of points distributed along two perpendicular axes, the temporal axis and the frequency axis. Along the frequency axis, it is possible to distinguish as many points as there are carrier frequencies. Along the temporal axis, one point corresponds to the duration of a symbol.

For example, this distribution ensures that at least two successive source data elements are not transmitted consecutively and/or on one and the same carrier frequency. More generally, the distance between two successive encoded data elements in the time-frequency space is at least such that the statistical independence between these data elements is ensured.

In practice, this distribution 24 in the time-frequency space may correspond to an interleaving in time $24_A$ consisting, for example, of a selective application of delays of different durations, followed by a frequency interleaving $24_B$, consisting of a selective assigning of the delayed data elements to the different carriers.

In the specific case of the invention, this interleaving is not applied systematically to all the data elements. More specifically:

- the data elements forming the fast information channel (FIC) are not temporally interleaved ($24_A$) but frequency interleaved ($24_B$);
- the other data elements (MSC) are temporally interleaved ($24_A$) and frequency interleaved ($24_B$).

To do this, the temporal interleaving module $24_A$ is selectively activated by an activation module 219 which controls it in such a way that the MSC data elements are temporally interleaved and that the FIC data elements are not temporally interleaved.

Each carrier frequency is then modulated by the sequence of data elements $C_k$ that is intended for it. This modulation operation may be done by the application of a reverse fast Fourier transform (FFT) 26 on the sequence 25 of data elements.

The reverse transform module 26 delivers elementary symbols of modulation 27 that correspond to the simultaneous modulation of the N carrier frequencies and that are each intended for transmission during the time interval $T_s = t_s + \text{DELTA}$, where $t_s$ is the duration of the useful "symbol" to which the demodulation will relate, and where DELTA represents the duration of the guard interval (for example: $\text{DELTA} = T_s/4$).

These symbols 27 are then sent, in a standard way, by means of a transmission module 28 which notably carries out the digital/analog conversion of the symbol 27, then a transposition of the corresponding analog signal to the radiofrequency domain.

Each transmitted symbol $x(t)$ can be written as follows:

$$x(t) = \sum_{k=0}^{N-1} Re\left(C_k \cdot e^{2i\pi f_k t}\right) \text{ pour } t \in [0, T_s]$$

where $f_k = f_0 + k/t_s$
and with:
N: number of carriers of the multiplex of orthogonal carriers;
$f_0$: arbitrary frequency;
$C_k$: element of the modulation alphabet.

The signal sent in the transmission channel 29 (generally having multiple paths) is received in a reception module 210 of the radiocommunications receiver, which is also a standard element.

If the guard interval is longer than the pulse response of the channel, and if this interval varies slowly with respect to the duration $T_s$ of a symbol (invariance of the channel for the duration of a symbol), each symbol received (not affected by the intersymbol interference) can be put in the form:

$$y(t) = \sum_{k=0}^{N-1} Re\left(H_k \cdot C_k^{2i\pi f_k t}\right)$$

where $H_k$ represents the response of the channel 29 at the frequency $f_k$.

In the reception module 210, the signal received is demodulated on the channels, in phase and in quadrature, of a local oscillator for transposition to the frequency $f_0 + 1/(2T)$ and sampled by an analog/digital converter at the rate of $1/T$, with $T = t_s/N$.

The signal 221 obtained is written as follows:

$$x(nT) = (-1)^n \cdot \sum_{k=0}^{N-1} C_k \cdot H_k \cdot e^{2i\pi \frac{nk}{N}}$$

$(n = 0 \text{ à } n - 1)$

This signal 211 is subjected to a transform (FFT) 212, that is symmetrical with the reverse transform 26. This transform 212 delivers the following data elements 213:

$$X_k = H_k \cdot C_k = \sum_{n=0}^{N-1} (-1)^n x(nT) \cdot e^{-2i\pi \frac{nk}{N}}$$

on the set $[(-1)^n x(nT)]_{n=0 \text{ à } N-1}$

These data elements 213 are then corrected (214) (elimination of the term $H_k$) by coherent or differential demodulation. In the case of a differential demodulation 214, and if a temporal index j is introduced on each carrier, $C_{j,k}$ is the product of a differential encoding of the data elements:

$$C_{j,k} = C_{j-1,k} \cdot D_{j,k}$$

where $D_{j,k}$ are the raw data elements. The demodulation consists in the use, at the row j, of a simplified estimator of the channel deducted from the row $j-1$.

$$\widetilde{H}_{j,k} = H_{j-1,k}$$

The following estimated data elements are thus obtained:

$$X_{j,k} \cdot X^*_{j-1,k} = (C_{j,k} \cdot C^*_{j-1,k}) \cdot (H_{j,k} \cdot H^*_{j-1,k}) = D_{j,k} \cdot |H_{j,k}|^2$$

These data elements 215 are then submitted to a de-interleaving module 216 that carries out the operations that are the reverse of the module 24, so as to reconstitute the original order of the symbols, which are then directed to a decoding module 217 that carries out an a posteriori maximum likelihood decoding operation such as a soft decision Viterbi decoding. In this decoding module 217, the multiplier factor $H^*_{j,k}$ of the previous equation is directly representative of the confidence associated with the decision.

In the case of the invention, the de-interleaving module 216 carries out a different de-interleaving, depending on whether the data elements are FIC data elements or MSC data elements (symmetrically with the interleaving 24). Consequently, a module 220 for the activation of the temporal de-interleaving controls this de-interleaving module 216 so that the temporal de-interleaving is effected solely for data elements that have undergone a corresponding interleaving.

In practice, there is always noise during the transmission of the signals. The received signal should therefore be written as:

$$X_{j,k} = H_{j,k} \cdot C_{j,k} + N_{j,k}$$

where $N_{j,k}$ is a complex Gaussian noise, each component of which has a variance $\sigma^2_{j,k}$.

The decoding according to the a priori maximum likelihood criterion then consists in minimizing the expression:

$$\Sigma_j \Sigma_k \| X_{j,k} - H_{j,k} \cdot C_{j,k} \|^2 / (2 \cdot \sigma^2_{j,k})$$

Thus, after a decoding if any of the concatenated code, if such a code has been implemented at transmission, the decoding module gives the signal 218 corresponding to the source signal 121.

One of the essential advantages of the COFDM system is that the receivers are not disturbed by the received echos of the signal. On the contrary, they derive advantage therefrom.

It is recalled, indeed, that this system has been designed notably to enable the reception of digital signals in mobile receivers even, and especially, in particularly hostile transmission environments, such as urban environments.

Thus, the COFDM system works in channels assigned multiple paths, due to the presence of natural obstacles (buildings, trees, vehicles etc.). Canals such as these may be modelized by a Rayleigh distribution or a Rice-Nagakami distribution (if a path predominates).

In other words, the receivers must include means to reconstitute the digital data elements sent, compensating for the problems due to the disturbances, and notably for the echos induced by the transmission channel.

In the case of the COFDM system, this result is achieved notably by means of the temporal and frequency interleaving (diversity in frequency), the use of a convolutional encoding and the presence of a guard interval between two consecutive data symbols.

In a broadcasting system, the existence of multiple paths generally appears to be an advantage, the receivers taking account of and exploiting the contributions corresponding to each of these paths.

This advantageous characteristic furthermore enables the implementation of single-frequency broadcasting networks, namely networks comprising co-channel transmitters, all transmitting on the same modulation frequency, each transmitter being seen as an echo.

A clear distinction must be made between the terms "multiple carrier" and "single frequency" which do not apply to the same phase of processing of the signal to be sent.

The principle of single-frequency networks amounts to generating active echos (interpreted as natural echos). Thus, the range of the radiocommunications network may be extended without limit, without its being necessary for the receivers to be equipped with specific means, for example to change the reception frequency.

What is claimed is:

1. A method for transmission of digital data elements, notably towards at least one radio paging receiver having its own identifier, comprising the steps of:

providing source data elements representing source signals to be transmitted;

grouping said source data elements into first symbols, each first symbol including a predetermined number of source data elements, said grouping being done so as to induce a time interleaving of said source data elements;

grouping said first symbols into at least one first channel, called main service channel;

generating control data elements, notably for controlling access to said source data elements;

grouping said control data elements into second symbols, each second symbol including a predetermined number of control data elements, said grouping being done so as not to induce a time interleaving of said control data elements;

grouping said second symbols into at least one second channel, called fast information channel;

forming frames of symbols, each frame having a same predetermined number of symbols and comprising:
at least one synchronization symbol, known from receivers and located at the beginning of each frame;
at least one fast information channel; and
at least one main service channel; and transmitting each symbol forming said frame, by simultaneously modulating a set of orthogonal carrier frequencies, each of said carrier frequencies being modulated by distinct data elements of each of said first and second symbols, so as to transmit simultaneously the data elements forming each of said first and second symbols.

2. A method according to claim 1, further comprising the steps of:

inserting in the fast information channel of periodically selected frames, called numbered frames, a frame number belonging to a set of predefined frame numbers, in such a way that each of said frame numbers is inserted into a frame at predetermined fixed time intervals;

assigning to each of said at least one radio paging receiver at least one of said frame numbers; and transmitting a radio paging message to one of said at least one radio paging receiver, said message comprising firstly the identifier of said receiver and, secondly, useful information elements, at least said identifier being transmitted in said fast information channel of a frame bearing a number assigned to said receiver.

3. A method according to claim 2, wherein in each of said numbered frames, a first symbol of said fast information channel comprises a presence indicator of radio paging information in said frame.

4. A method according to claim 2, wherein a first part of said identifier corresponds to at least one frame number assigned to said receiver, and wherein a second part of said identifier designates solely said receiver, 5. A method according to claim 2, wherein said predetermined fixed time interval between two frames bearing the same frame number ranges from 30 seconds to 5 minutes approximately.

6. A method according to claim 1, wherein said at least one synchronization symbol comprises a wobbulation symbol, giving a phase reference for demodulating each carrier frequency of the symbols of said frame, and wherein said fast information channel directly follows said wobbulation symbol.

7. A method according to claim 1, wherein said source information elements are encoded by means of a systematic convolutional code.

8. A method according to claim 1, wherein the fast information channel of a current frame comprises at least one piece of information designating source data elements contained in said at least one first channel of the current frame.

9. A method according to claim 1, wherein the fast information channel of a current frame comprises at least one piece of information designating source data elements contained in said at least one first channel of at least one frame to come.

10. A method according to claim 1, applied to a cellular broadcasting network comprising at least two cells with distinct broadcasting zones, wherein each of said at least one radio paging receiver is associated selectively with at least one of said cells, and wherein a radio paging message intended for a given radio paging receiver is transmitted only to the cell or cells associated with said given paging receiver.

* * * * *

UNITED STATES PATENT AND TRADEMARK OFFICE
CERTIFICATE OF CORRECTION

PATENT NO. : 5,452,288            Page 1 of 2

DATED : 19 September 1995

INVENTOR(S) : Rahuel, et al.

It is certified that error appears in the above-identified patent and that said Letters Patent is hereby corrected as shown below:

Column 5, line 62, "flames" should read --frames--.

Column 10, line 12, "144" should read --$14_4$--.

Column 12, line 5, "S2" should read --S'2--; line 33, "$31_1$" should read --$32_1$--; and line 43, "are :several" should read --are several--.

Column 17, lines 49 and 51, "flames" should read --frames--.

Column 22, lines 51-52, "{1+i,1-i,-1-i,-1-} should read --{1+i,1-i,-1+i,-1-i}--.

Column 23, line 31, "(FFT)" should read --(FFT$^{-1}$)--.

Column 23, line 50, in the equation "2iπfkt" should read --$2i\pi f_k t$--.

UNITED STATES PATENT AND TRADEMARK OFFICE
CERTIFICATE OF CORRECTION

PATENT NO. : 5,452,288
DATED : September 19, 1995
INVENTOR(S) : Rahuel, et. al.

It is certified that error appears in the above-indentified patent and that said Letters Patent is hereby corrected as shown below:

Column 24, line 3, in the equation "$2i\pi fkt$" should read $--2i\pi f_k t--$.

Signed and Sealed this

Twenty-second Day of October, 1996

Attest:

*Bruce Lehman*

BRUCE LEHMAN

*Attesting Officer*     *Commissioner of Patents and Trademarks*